United States Patent
O'Lenick, Jr. et al.

(10) Patent No.: US 6,524,705 B1
(45) Date of Patent: Feb. 25, 2003

(54) SILICONE SURFACE TREATED METAL OXIDES

(75) Inventors: Anthony J. O'Lenick, Jr., Dacula, GA (US); John Imperante, Somerville, NJ (US)

(73) Assignee: Phoenix Research Corporation, Somerville, NJ (US)

( * ) Notice: Subject to any disclaimer, the term of this patent is extended or adjusted under 35 U.S.C. 154(b) by 0 days.

(21) Appl. No.: 09/974,678

(22) Filed: Oct. 11, 2001

(51) Int. Cl.[7] .................................................. B32B 5/10
(52) U.S. Cl. ........................ 428/402; 428/403; 428/404; 428/405; 556/10; 424/59
(58) Field of Search ................................ 428/402, 403, 428/404, 405; 556/10; 424/59

(56) References Cited

U.S. PATENT DOCUMENTS

| | | | | |
|---|---|---|---|---|
| 5,756,788 A | * | 5/1998 | Mitchnick | 556/10 |
| 5,888,290 A | * | 3/1999 | Engle | 106/287.12 |
| 6,458,453 B1 | * | 10/2002 | Hayashi | 428/323 |
| 6,485,831 B1 | * | 11/2002 | Fukushima | 428/403 |

* cited by examiner

*Primary Examiner*—Leszek Kiliman

(57) ABSTRACT

This invention relates to metal oxide particles made treated with a novel silanic hydrogen containing silicone, that provide metal oxide particles that have modified dispersibility in a variety of solvents, including silicone fluid, mineral oil, and fluoro solvents. The process of coating the metal oxide with a silicone polymer comprises oxide by reacting of a specific type of reactive silicone, which is applied to the metal oxide, followed by heating the coated metal oxide to 40° C. to 100° C. for between 1 and 10 hours for the reaction to occur.

11 Claims, No Drawings

SILICONE SURFACE TREATED METAL OXIDES

FIELD OF THE INVENTION

This invention relates to metal oxide particles made treated with a novel silanic hydrogen containing silicone, that provide metal oxide particles that have modified dispersibility in a variety of solvents, including silicone fluid, mineral oil, and fluoro solvents. The process of coating the metal oxide with a silicone polymer comprises oxide by reacting of a specific type of reactive silicone, which is applied to the metal oxide, followed by heating the coated metal oxide to 40° C. to 100° C. for between 1 and 10 hours for the reaction to occur. Depending upon the specific silicone chosen, he resulting coated metal oxide particles are non-reactive, and will have increased dispersibility in a variety of solvents. As will become apparent in reading this invention, when the silanic hydrogen containing silicone polymer has fluoro functionality, the dispersibility in fluoro solvents increases. When the silanic hydrogen containing silicone polymer has alkyl functionality, the dispersibility in mineral oil increases. This ability to regulate dispersibility allows for the use of metal oxide pigments in a variety of solvents, making formulation easier that heretofore possible.

DESCRIPTION OF THE ART

Metal oxides, such as zinc oxide, titanium dioxide and iron oxide, are well known compounds that are useful in a variety of applications. For example, titanium dioxide, is used as a pigment in paint, as an additive in cosmetic products, cements, glass, rubber, glue, matches, inks and semiconductors. The use of titanium dioxide in so many application areas is a direct result of the many differing and useful properties of the pigment.

The ability to place metal oxide particles in formulations is complicated by the ability to disperse the pigment in the desired solvent. The ability to modify the pigment by using a reactive material that modifies the surface in a permanent way, making dispersibility of the pigment in a variety of solvents.

U.S. Pat. No. 5,756,788 issued May 26, 1998 to Mitchnick et al addresses making a pigment hydrophobic (water hating). The compounds used are methoxy compounds and methanol is produced. The compounds of the patent are used as waterproof sun-screening agents. The ability to produce materials that have dispersibility in a variety of solvents is not addressed by Mitchnick et al.

The present invention overcomes the shortfalls allowing the formulator to use metal oxides that have been modified using reactive silicone compounds to get pigments dispersible products in a variety of solvents. Specifically, the concept is by covalently bonding a variety of functional groups with differing solubility onto the pigment the dispersibility of the resulting treated pigment s improved. Simply put, "like disperses like". The more a pigment's surface resembles the solvent in which it is being placed, the more dispersible the pigment.

SUMMARY OF THE INVENTION

The present invention provides processes for modifying the surface of metal oxides by reaction with a silanic hydrogen compound. The silanic hydrogen portion of the silicone molecule allows one to covalently bind the silicone to the surface so treated. By selecting the proper functionalized silanic hydrogen the resulting modified metal oxides prepared from such processes, have improved dispersibility in a variety of solvents.

Thus, it is one aspect of this invention to provide a process for treating metal oxides comprising contacting the metal oxide with an effective treating amount of a silicone compound having the formula:

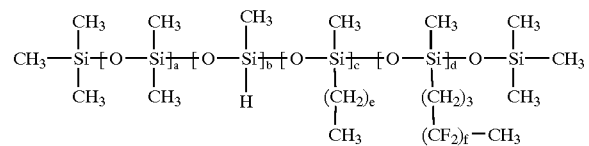

wherein;
  a is an integer ranging from 0 to 100;
  b is an integer ranging from 1 to 20;
  c and d are independently integers ranging from 0 to 20, with the proviso that c or d is at least 1;
  e is an integer ranging from 9 to 31;
  f is an integer ranging from 1 to 20;
and heating the mixture of silicone compound and metal oxide to a temperature of 40.degree. C. to 100.degree. C. for two to ten hours. The effective amount of silicone compound is defined as that amount of silicone compound which is used to produce a coated, functionalized metal oxide particle containing a desired percent, preferably ranging from 0.1 to 25%, by weight of the silicone compound.

Any of a variety of metal oxides may be processed using the invention including zinc oxide, titanium dioxide, iron oxide, cesium oxide, zirconium oxide, silicon dioxide and antimony oxide.

DETAILED DESCRIPTION OF THE INVENTION

As stated it is one aspect of this invention to provide a process for treating metal oxides comprising contacting the metal oxide with an effective treating amount of a silicone compound having the formula:

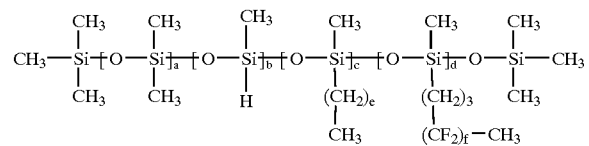

wherein;
  a is an integer ranging from 0 to 100;
  b is an integer ranging from 1 to 20;
  c and d are independently integers ranging from 0 to 20, with the proviso that c or d is at least 1;
  e is an integer ranging from 9 to 31;
  f is an integer ranging from 1 to 20;
and heating the mixture of silicone compound and metal oxide to a temperature of 40.degree. C. to 100.degree. C. for two to ten hours. The effective amount of silicone compound is defined as that amount of silicone compound which is used to produce a coated, functionalized metal oxide particle containing a desired percent, preferably ranging from 0.1 to 25%, by weight of the silicone compound.

Any of a variety of metal oxides may be processed using the invention including zinc oxide, titanium dioxide, iron oxide, cesium oxide, zirconium oxide, silicon dioxide and antimony oxide.

The functionality of each group in the molecule is critical to the functionality.

$$CH_3-\underset{\underset{CH_3}{|}}{\overset{\overset{CH_3}{|}}{Si}}-[O-\underset{\underset{CH_3}{|}}{\overset{\overset{CH_3}{|}}{Si}}]_a-[O-\underset{\underset{H}{|}}{\overset{\overset{CH_3}{|}}{Si}}]_b-[O-\underset{\underset{(CH_2)_e-CH_3}{|}}{\overset{\overset{CH_3}{|}}{Si}}]_c-[O-\underset{\underset{(CH_2)_3-(CF_2)_f-CH_3}{|}}{\overset{\overset{CH_3}{|}}{Si}}]_d-O-\underset{\underset{CH_3}{|}}{\overset{\overset{CH_3}{|}}{Si}}-CH_3$$

wherein;
 a is an integer ranging from 0 to 100;
 b is an integer ranging from 1 to 20;
 c and d are independently integers ranging from 0 to 20, with the proviso that c or d is at least 1;
 e is an integer ranging from 9 to 31;
 f is an integer ranging from 1 to 20.

The "a" group is the silicone soluble group. If c, d, and e are all zero, the molecule will improve the dispersibility of the pigment in silicone fluid. Consequently, if one in making a long wear lipstick, containing silicone, the selection of a product having a large "a"no "b", "c", or "d" is recommended.

The "b" group is the reactive group. If it is 1 then the molecule is loosely bonded. If it is 20 a more rigid resin coating forms.

The other groups' solubilities are listed.

| Group | Type | Solubility |
|---|---|---|
| a | siloxane | silicone fluid |
| b | Silanic Hydrogen | reactive groups |
| c | alkyl | mineral oil soluble |
| d | perfluoro ether | fluoro soluble |

If c, or d, is zero, a coating that promotes dispersibility in the shown type of compound results.

If several of c, and d are non-zero values, the ability for the pigment to complex the component with the lower value is enhanced. For example if c is 3 and d is 20, the resulting treated pigment will disperse well in fluoro solvents and have the ability to complex oils into the resulting dispersion, rendering it thicker and more stable. Consequently, pigments treated the compounds of the present invention wherein at least two of c, and d are greater than zero, represents a preferred embodiment.

The reaction that occurs using titanium dioxide is representative metal oxide. We believe the reaction occurs at the active sites on the metal oxide, in this case, titanium dioxide, reacting with the silianic hydrogen (Si—H) to result in a covalent bond between silicone and titanium dioxide, and the formation of hydrogen gas. Since no water is present in this process, the metal oxide crystals remain intact and "frozen" in shape by the silicone, which acts like a matrix for the titanium dioxide crystals. The silicone preserves the structure of the titanium dioxide crystals, eliminates the reactivity in water, and modifies the surface making the pigment more dispersible in the desired solvent.

The processes of this invention may also be used to coat metal oxides other than zinc oxide and titanium dioxide, including, but not limited to, iron oxide, cesium oxide, zirconium oxide, silicon dioxide, and antimony oxide, or combinations thereof.

Preferred Embodiments

In a preferred embodiment the surface treated metal oxide is treated with a concentration of silicone compound ranging from 0.1 to 25% by weight.

In another preferred embodiment the surface treated metal oxide is treated with a concentration of silicone compound ranging from 0.5 to 20% by weight.

In still another preferred embodiment the surface treated metal oxide is treated with a concentration of silicone compound ranging from 1.0 to 10% by weight.

In a preferred embodiment c is 0.

In a preferred embodiment d is 0.

In a preferred embodiment c and d each range from 1 to 20.

EXAMPLES

Silicone Compounds

The silicone compounds useful for the preparation of the compounds of the present invention were provided by Siltech Corporation and conform to the following structures:

$$CH_3-\underset{\underset{CH_3}{|}}{\overset{\overset{CH_3}{|}}{Si}}-[O-\underset{\underset{CH_3}{|}}{\overset{\overset{CH_3}{|}}{Si}}]_a-[O-\underset{\underset{H}{|}}{\overset{\overset{CH_3}{|}}{Si}}]_b-[O-\underset{\underset{(CH_2)_e-CH_3}{|}}{\overset{\overset{CH_3}{|}}{Si}}]_c-[O-\underset{\underset{(CH_2)_3-(CF_2)_f-CH_3}{|}}{\overset{\overset{CH_3}{|}}{Si}}]_d-O-\underset{\underset{CH_3}{|}}{\overset{\overset{CH_3}{|}}{Si}}-CH_3$$

wherein;
 a is an integer ranging from 0 to 100;
 b is an integer ranging from 1 to 20;
 c and d are independently integers ranging from 0 to 20, with the proviso that c or d is at least 1;
 e is an integer ranging from 9 to 31;
 f is an integer ranging from 1 to 20.

Silicone Compounds Useful for the Present Invention

| Example | a | b | c | d | e | f |
|---|---|---|---|---|---|---|
| 1 | 0 | 5 | 0 | 3 | — | 8 |
| 2 | 5 | 1 | 0 | 10 | — | 1 |
| 3 | 10 | 5 | 1 | 1 | 31 | 10 |
| 4 | 20 | 10 | 10 | 0 | 9 | — |
| 5 | 50 | 15 | 20 | 20 | 11 | 20 |
| 6 | 100 | 20 | 15 | 0 | 13 | — |

The following are examples of materials that are compounds useful in treating the titanium dioxide according to our invention;

Titanium Dioxide

Titanium dioxide used in the preparation of the compounds of the present invention are commercially available from, SunSmart Inc.

Process

The compounds of the present invention are prepared by contacting titanium dioxide with an effective surface treating amount (preferably an amount to produce metal oxides containing silicone polymer ranging from 0.1% and 25% by weight) of a silicone which conforms to the following structure:

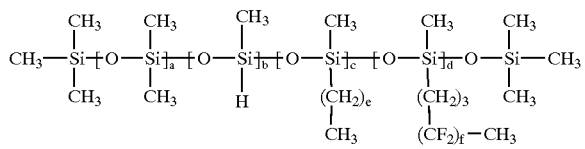

wherein;

a is an integer ranging from 0 to 100;

b is an integer ranging from 1 to 20;

c and d are independently integers ranging from 0 to 20, with the proviso that c or d is at least 1;

e is an integer ranging from 9 to 31;

f is an integer ranging from 1 to 20;

then heating the intermediate to a temperature of between 40.degree. C. and 100.degree. C. for between 2 hr and 10 hr. During this time alcohol is removed. The reaction is considered complete when 97% of the theoretical hydrogen is removed. The quantity of hydrogen removed is considered more important than the time at which the material is held at temperature.

The titanium dioxide is coated dry. The silicone can be applied by simply mixing it with the titanium dioxide, or in a preferred method using traditional methods for applying liquids to solids like a "V" blender.

Example 7

To 90.0 grams of titanium dioxide is added an effective surface coating amount of 10.0 grams of silicone Example #1. The powder is then mixed well. The powder is then placed in an oven and heated to 80.degree. C. for 6 hr. During this time hydrogen is removed. The reaction is considered complete when 97% of the theoretical alcohol is removed. The amount of alcohol removed is determined by weighing the contained.

Examples 8–12

Example 7 is repeated only this time the specified effective surface modifying amount of the specified silicone is added in place of the 10 grams of silicone Example 1 and the specified number of grams of titanium dioxide are used.

|  | Silicone Compound | |
| --- | --- | --- |
| Example | Example | Grams |
| 8 | 2 | 8 |
| 9 | 3 | 10 |
| 10 | 4 | 5 |
| 11 | 5 | 3 |
| 12 | 6 | 20 |

Applications Examples

| Example No Treatment | Dispersible in Nothing |
| --- | --- |
| 7 | mineral oil |
| 8 | mineral oil |
| 9 | fluoro solvent and mineral oil |
| 10 | fluoro Solvent |

-continued

| Example No Treatment | Dispersible in Nothing |
| --- | --- |
| 11 | fluoro solvent and mineral oil |
| 12 | mineral oil |

As can be seen the modification of the surface of the pigment changes the solubility in mineral oil and fluoro solvent. The substitution of other pigments into the process of the current invention results in the same type of results.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

What is claimed is:

1. A surface coated metal oxide prepared by contacting the metal oxide with an effective surface-treating amount of a silicone compound having the formula:

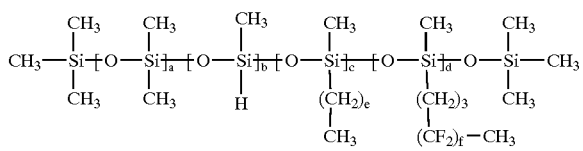

wherein;

a is an integer ranging from 0 to 100;

b is an integer ranging from 1 to 20;

c and d are independently integers ranging from 0 to 20, with the proviso that c or d is at least 1;

e is an integer ranging from 9 to 31;

f is an integer ranging from 1 to 20.

2. A surface treated metal oxide of claim 1 wherein the concentration of silicone compound ranges from 0.1 to 25% by weight.

3. The surface treated metal oxide of claim 1 wherein the concentration of silicone compound ranges from 0.5 to 20% by weight.

4. A surface treated metal oxide of claim 1 wherein the concentration of silicone compound ranges from 1.0 to 10% by weight.

5. A surface treated metal oxide of claim 1 wherein c, is 0.

6. A surface treated metal oxide of claim 1 wherein d is 0.

7. A surface treated metal oxide of claim 2 wherein the metal oxide is selected from the group consisting of zinc oxide, titanium dioxide, iron oxide, cesium oxide, zirconium oxide, silicon dioxide, and antimony oxide.

8. A process for surface treating a metal oxide comprising contacting the metal oxide with an effective surface treating amount of a silicone compound having the formula:

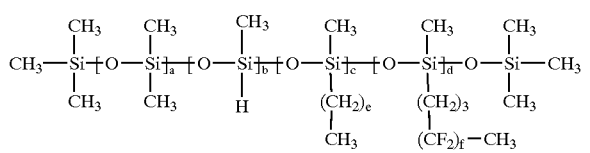

wherein;
- a is an integer ranging from 0 to 100;
- b is an integer ranging from 1 to 20;
- c and d are independently integers ranging from 0 to 20, with the proviso that c or d is at least 1;
- e is an integer ranging from 9 to 31;
- f is an integer ranging from 1 to 20;

and heating the mixture to a temperature between 40° C. and 100° C. for two to ten hours.

9. The process for surface treating a metal oxide according to claim 8, wherein c is 0.

10. The process for surface treating a metal oxide according to claim 8, wherein d is 0.

11. The process for surface treating a metal oxide according to claim 8, wherein c, and d are each at least 1.

* * * * *